United States Patent [19]
Hollander et al.

[11] Patent Number: 5,230,941
[45] Date of Patent: Jul. 27, 1993

[54] INSULATIVE MATERIAL WITH REFLECTIVE SPACE

[75] Inventors: David S. Hollander, Brooklyn; Mark S. Rubenstein, Long Beach, both of N.Y.

[73] Assignee: Transtech Service Network, Inc., Rosedale, N.Y.

[21] Appl. No.: 604,144

[22] Filed: Oct. 26, 1990

Related U.S. Application Data

[63] Continuation-in-part of Ser. No. 548,098, Jul. 5, 1990, abandoned, and a continuation-in-part of Ser. No. 266,017, Nov. 2, 1988, Pat. No. 5,000,372.

[51] Int. Cl.⁵ .................................................. B32B 3/12
[52] U.S. Cl. .................................... 428/116; 428/118; 493/966
[58] Field of Search ................. 428/116, 117, 118, 73; 493/966

[56] References Cited

U.S. PATENT DOCUMENTS

| | | | |
|---|---|---|---|
| 3,249,659 | 5/1966 | Voelker | 428/117 X |
| 3,664,906 | 5/1972 | Hartig | 428/116 |
| 3,982,057 | 9/1976 | Briggs et al. | 428/118 X |
| 4,928,847 | 5/1990 | Hollander et al. | 220/408 |
| 5,000,372 | 3/1991 | Hollander et al. | 428/118 X |

*Primary Examiner*—Henry F. Epstein
*Attorney, Agent, or Firm*—Kane, Dalsimer, Sullivan, Kurucz, Levy, Eisele and Richard

[57] ABSTRACT

The invention relates to an insulative structure with both outwardly and inwardly facing aluminum foil layers supported by kraft paper layers which are, in turn, supported by a kraft paper honeycomb structure with walls perpendicular to the aluminum and kraft paper layers. The honeycomb structure includes a series of interlocking hexagonal compartments which support airspaces therewithin.

12 Claims, 1 Drawing Sheet

INSULATIVE MATERIAL WITH REFLECTIVE SPACE

This application is a continuation-in-part of application Ser. No. 07/266,017, filed Nov. 2, 1988 and now U.S. Pat. No. 5,000,372, and of application Ser. No. 07/548,098, filed on Jul. 5, 1990 and now abandoned.

BACKGROUND OF THE INVENTION

This application is related to commonly owned U.S. Pat. No. 4,928,847, issued on May 29, 1990.

FIELD OF THE INVENTION

This invention relates to the use of a honeycombed kraft paper structural medium to separate two aluminum foil reflective surfaces which face each other to form an insulative reflective space. This utilization of radiant barrier technology in maximizing the thermal efficiency of an airspace is particularly useful for the construction of insulation panels. This panel has inherent qualities which allow the panel to be fabricated into unique packages for foodstuffs which must be maintained at a low temperature during transportation.

Additional applications extend into all areas of temperature control including home and building insulation. The strength and composition makes the panel an attractive alternative to foam and glass insulations.

DESCRIPTION OF THE PRIOR ART

Aluminum foil is not, by itself, an effective thermal insulator. It is merely a metal which is capable of transferring heat by conduction faster than most non-metals due to the characteristics of the outer valence electrons of the metal atom. When a foiled surface is adjoined by a "still" airspace, a reflective space acts as an insulated barrier as it retards radiant heat (irrespective of heat flow direction) and thus reduces thermal transfer.

The magnitude of that reduction of heat transfer is dependent upon maintaining the integrity of the airspace from a structural standpoint.

The overall thermal efficiency of an airspace will vary with the content of moisture (which increases the thermal conductivity of air) and the presence of convective currents. The performance of reflective surfaces in radiant barrier insulators is enhanced by providing maintaining and insuring an optimum adjoining airspace.

Currently available reflective insulating products have reflective surfaces on one or both sides of the material, where these reflective surfaces face away from the core medium. In some packaging applications, these reflective insulators are being directly substituted for homogeneous foams (e.g., EPS, Isocyanurate); replacing the foams as insulating liner material. Since both reflective surfaces can come in direct contact with either the pack load or container wall, the thermal efficiency of either reflective surface can be significantly reduced or eliminated entirely. As a result, radiant barrier performance data is often misused because of the lack of consideration for the actual application. Eliminating the benefits created by a low emissivity surface could reduce performance by as much as fifty percent; especially in the case of surfaces which enclose a medium and rely primarily on those outwardly facing reflective surfaces for added thermal performance.

SUMMARY OF THE INVENTION

The invention includes an insulated panel, utilizing reflective surfaces as radiant barriers to create a "reflective space" enclosed by panel's inner reflective facings. The reflective airspace is structurally maintained by the inclusion of a honeycomb paper core of nominal thickness to ensure the structural integrity of the airspace and minimize convection currents. The objective of creating such a panel is to integrate effectively a radiant barrier into all insulation applications, especially those applications concerned with packaging. It is intended by the use of such a panel to assure consistent performance levels irrespective of the orientation of the outer foil surfaces within the package, and allow the user of such a panel more freedom in substitution for homogeneous foam panels.

The insulated panel comprises two laminated kraft facings sandwiching a honeycomb kraft paper core. The kraft paper facings are laminated on two sides with aluminum foil with emissivity values ideally less than or equal to 0.05. The aluminum laminated facing, when bonded directly to the honeycomb core on both sides, creates a sandwich-type structure.

The honeycomb panel structure replicates the insulating system of a thermos, in that a still airspace is enclosed by reflective surfaces. By limiting a core medium to still air, heat transfer by conduction is severely minimized. In addition to providing the support structure to create a cavity between reflective surfaces, the honeycomb cells divide the airspace into smaller cells and minimize heat transfer by convection as well. Since the balance of heat transfer could only occur by radiative means through this environment, the inner wall surfaces are laminated with an "ultra-low" emissivity aluminum foil, the only barrier that can severely minimize long wave radiation transfer.

Although the insulation panel minimizes all three forms of heat transfer, it is important to note that the magnitude of that reduction of heat transfer is dependent upon maintaining the integrity of the airspace from a structural standpoint.

ENGINEERING MODEL

Although the instant invention satisfies conditions for reducing radiant energy transfer, convection and conduction heat transfer must also be reduced. Since total heat transfer is the total of all three types of heat transfer, decreases in either conduction or convection will increase the percent contribution of radiant energy to the total heat transferred.

As convection is minimized by small honeycomb cell (one half inch) sizes, a model could be created which takes into account combined conductivity (by air only) and radiation transfer only. The model will demonstrate the effects of surface emissivities on the total air conductivity of the enclosed airspace by use of an elementary model used to analyze "heat transfer through still air" in the bi-guarded hot plate apparatus. (The bi-guarded hot plate is an apparatus which measures heat transfer through a medium. Air is frequently used as a reference material to compare measurements in round-robin studies of thermal transfer.)

Since convection heat transfer is minimized by small honeycomb cells, the total heat flux may be represented as the sum of the radiation and conduction heat fluxes:

$$H_T = H_G + H_R \qquad (1)$$

where:
 $H_T$ = Total heat flux
 $H_G$ = Conductive heat flux (still air)
 $H_R$ = Radiation heat flux
 Fourier's law can be recalled to show the heat flux of still air as:

$$H_G = K_G * (T_H - T_C) \div L \qquad (II)$$

where:
 $T_H$ = Temperature of the hot surface
 $T_C$ = Temperature of the cold surface
 $K_G$ = Gas thermal conductivity (still air)
 L = Air layer thickness, while the Stephan-Boltzmann law can be used to more closely analyze radiative heat flux through a layer of transparent air:

$$H_R = S * (T_H^4 - T_C^4) \div (e_H^{-1} + e_C^{-1} - 1) \qquad (III)$$

where:
 S = Boltzmann constant
 $e_H$ = Hot surface emissivity
 $e_C$ = Cold plate emissivity In order to derive the total conductivity of the still airspace, total heat flux ($H_T$) (in expression I and expression III) by Fournier's law must be represented and conductivity (K) extracted from the expressions.

Therefore, if a small temperature gradient is assumed, the total heat flux $H_T$ could also be expressed by Fourier's Law.

$$H_T = K_T * (T_H - T_C) \div L \qquad (IV)$$

where $K_T$ is the total "equivalent thermal conductivity" or total conductivity.

By again using Fourier's law, radiative heat flux can be similarly represented as:

$$H_R = K_R * (T_H - T_C) \div L \qquad (V)$$

where $K_R$ is apparent radiative thermal conductivity.

By combining each representation of radiative heat flux[1] (Stephan-Boltzmann expression and Fourier's expression) and approximately $(T_H^4 - T_C^4)$ by substituting the expression's mathematical derivative $(4*\overline{T}^3 * [T_H - T_C])$, the following is obtained[2]:

$$K_R = 4 * S\overline{T}^3 * L \div (e_H^{-1} + e_C^{-1} - 1) \qquad 45$$

after the expression is solved for $K_R$.

That is, by combining of expression III with expression IV by the substitution of $H_R$ of expression III into the $H_R$ of expression IV. Note that $\overline{T} = (T_H + T_C) \div 2$. This approximation is accurate to within one percent for $(T_H - T_C) < 50°$ C.

Since the foil surfaces will be substantially identical, $e_H = e_C = e$, then $$K_R = 4 * S * \overline{T}^3 * L \div ((2 \div e) - 1) \qquad (VI)$$

By expression I and Fourier's law, total conductivity can be expressed as the sum of the gas thermal conductivity and radiative thermal conductivity:

$$K_T = K_G + K_R. \qquad (VII)$$

By substitution of VI, expression VII becomes:

$$K_T = K_G + ((4 * S * \overline{T}^3 * L) \div ((2 \div e) - 1) \qquad (VIII)$$

Given total conductance ($C_T$) to be:

$$C_T = K_T \div L,$$

$C_T$ as in I and VII could be represented by:

$$C_T = C_G + C_R \qquad (IX)$$

The expression for total conductivity (VIII) can be transformed by IX:

$$C_T = K_T \div L = C_G + ((4 * S * \overline{T}^3) \div ((2 \div e) - 1))$$

where $C_G = K_G L$ = conductance of gas.

$$C_R = 4 * S * \overline{T}^3 \div ((2 + e) - 1)$$
$$= \text{apparent radiative conductance.}$$

By assuming thermal conductance of air to be constant for any given temperature (T), one can focus on the impact of reducing emissivity by applying aluminum foil to the inner surface adjoining the airspace. It is important to note at this point the impact of two reflective surfaces adjoining a common airspace. The elimination of one of the surfaces could reduce thermal performance by as much as 15%. This can be demonstrated by working with the effects of emissivity (e) on the expression defining $C_R$ (apparent radiative conductance).

DEMONSTRATION OF MODEL

Assumptions $\overline{T} = (T_H - T_C) \div 2 = 24°$ C. $= 297°$ K.
L = thickness of airspace = 1 inch = 25.4 mm
$C_G$ = Thermal conductance of air, International Standardization of Air Reference = 1.04 W/M²K
S = Stephan-Boltzmann constant = 5.67 × 10 W/M²K⁴
e(paper) = 0.9
e(foil) = 0.05

By substitution of the above list of assumptions into the total conductance equation:

$$C_T = C_G + ((4 * S * \overline{T}^3) \div ((2 \div e) - 1))$$

One could estimate, by mathematical representation, the overall impact of reflective inner surfaces as a percentage of original conductance values with paper.

Original total conductance with paper inner surfaces:

$$C_T = 1.04 + ((4 * 5.67 \times 10^{-8} * (297)^3) \div$$
$$((2 \div 0.9) - 1))$$
$$= 5.91 \text{ W/M}^2\text{K}$$

Total conductance with foil inner surfaces:

$$C_T = 1.04 + ((4 * 5.67 \times 10^{-8} * (297)^3) \div$$
$$((2 \div 0.05) - 1))$$
$$= 1.19 \text{ W/M}^2\text{K}$$

This reveals significant reduction of total conductance of the enclosed airspace.

The overall thermal efficiency of the airspace improves by $(5.91 - 1.19) \div 5.91 = 0.798$, or approximately 80 percent.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
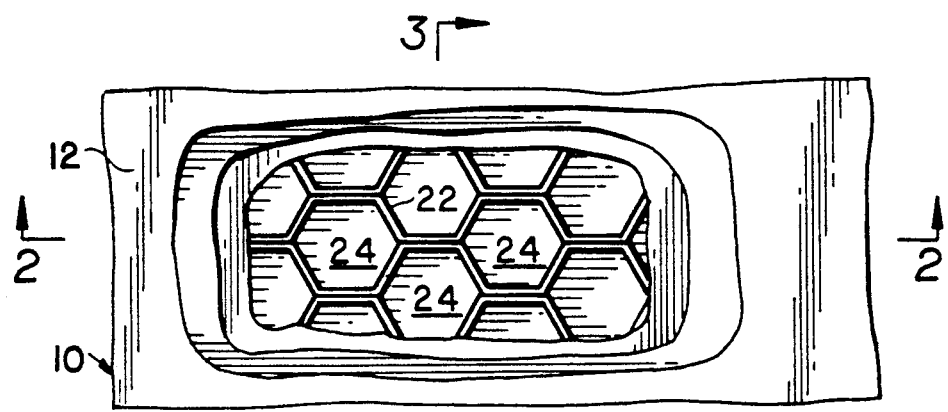
FIG. 1 discloses a plan view, partly in elevation, of the present invention.
Figure 2:
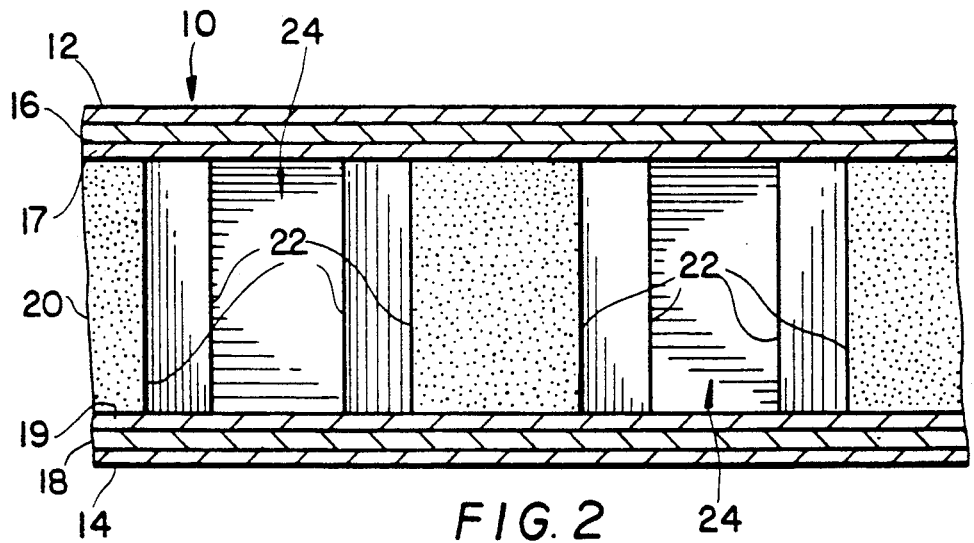
FIG. 2 discloses a cross-sectional view along plane 2—2 of the present invention.
Figure 3:
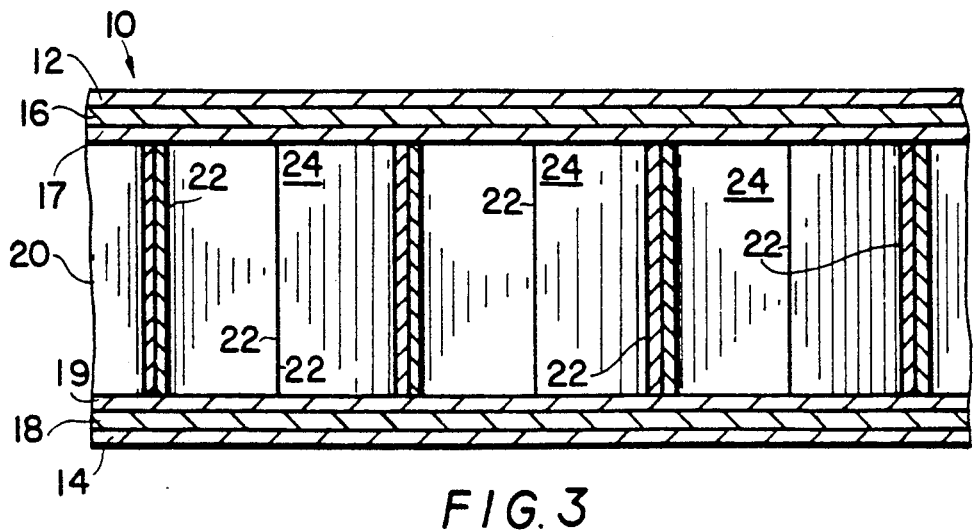
FIG. 3 discloses a cross-sectional view along plane 3—3 of the present invention.

Referring now to the drawings in detail wherein like numerals indicate like elements throughout the several views, FIG. 1 discloses a plan view of the present invention. The upper surface of the insulative structure 10 is covered with a layer of aluminum foil 12. As can be seen from FIGS. 2 and 3, a similar layer of aluminum foil 14 is on the lower surface of the insulative structure 10. The aluminum foil 12, 14 faces outwardly. Inwardly adjacent to layers of aluminum foil 12, 14 are layers of kraft paper 16, 18, illustrated herein as being single-ply. The aluminum foil 12, 14 is typically laminated to the kraft paper 16, 18. The inward faces of kraft paper 16, 18 include inwardly facing layers of aluminum foil 17, 19 thereby forming a reflective space therebetween which is resistant to all forms of heat transmission therethrough. Layers of kraft paper 16, 18 are supported by a honeycomb structure 20 which includes walls 22 which are perpendicular to layers 12, 14, 16, 18 thereby forming interlocking equilateral hexagonal compartments 24 with air pockets therein. Thus, these compartments are polygonal and hollow so as to maintain air space therein. This structure creates an "I-beam" type configuration. The honeycomb structure 20 is preferably of lowcost kraft paper and provides strength and support to insulative structure 10. Moreover, honeycomb structure 20 with compartments 24 precludes the presence of convection currents from one side of invention 10 to the other side (i.e., layer 12 to layer 14). Honeycomb structure 20 is in the range from about one half inch to four inches thick, that is, the distance between layers 16 and 18 is about one half to four inches.

It should be understood within the context of this application, that the term "paper" includes a range of paper material which includes kraft paper and cardboard.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A thermal insulative structure comprising a pair of upper and lower metallic foil layers, adjacent an interposed upper and lower paper sheet layer between and laminated to the foil layers of each pair, said upper and lower layers being separated by a honeycomb insulated barrier comprising a series of closed polygonal compartments separated by paper walls perpendicular to said upper and lower paper sheet and foil layers, said polygonal compartments being hollow so as to maintain airspaced therewithin, the honeycomb insulated barrier functioning the ensure the structural integrity of the air space defined by the honeycomb insulated barrier and retard radiant heat irrespective heat flow direction to thereby reduce thermal transfer and assuring thermal efficiency of the air space defined by the honeycomb insulated barrier by reducing the air in the space to still air so that heat transfer by conduction is minimized, the polygonal compartments functioning the minimize heat transfer by convection, the foil layers being reflective and possessing low emissivity to minimize heat transfer by radiation.

2. The heat insulative structure of claim 1 wherein said metallic foil layers are comprised of aluminum foil.

3. The thermal insulative structure of claim 2 wherein said paper sheet layers and said paper walls are comprised of kraft paper.

4. The thermal insulative structure of claim 3 wherein said closed polygonal compartments are equilateral hexagonally-shaped, interlocking in a honeycomb pattern.

5. The thermal insulative structure of claim 3 wherein said polygonal compartments create an I-beam type structure.

6. The thermal insulative structure of claim 4 wherein said compartments are substantially in the range of one half inch to one inch thick.

7. The thermal insulative structure of claim 1 wherein said metallic foil layers are comprised of material with an emissivity substantially not exceeding 0.05.

8. The thermal insulative structure of claim 7 wherein said paper sheet layers and said paper walls are comprised of kraft paper.

9. The thermal insulative structure of claim 8 wherein said closed polygonal compartments are equilateral hexagonally-shaped, interlocking in a honeycomb pattern.

10. The thermal insulative structure of claim 9 wherein said compartments are substantially in the range one half to one inch thick.

11. A thermal insulative structure comprising:
upper and lower reflective means and an interposed insulated barrier medium defining an insulating air space, at least one of the reflective means comprising a paper sheet layer and upper and lower metallic foil layers with the paper sheet layer interposed between the foil layers, each reflective means comprising upper and lower metallic foil layers laminated to an interposed paper sheet layer thereby creating a thermos effect, the medium comprising a series of hollow compartments separated by paper walls, the insulated barrier medium functioning to ensure the structural integrity of the air space defined by the insulated barrier medium and retard radiant heat irrespective of heat flow direction to thereby reduce thermal transfer and assuring thermal efficiency of the air space defined by the insulated barrier medium by reducing the air in the space to still air so that heat transfer by conduction is minimized, the insulated barrier medium functioning to minimize heat transfer by convection, the foil layers being reflective and possessing low emissivity to minimize heat transfer by radiation.

12. The structure according to claim 11 wherein the interposed medium is a honeycomb material.

* * * * *